2,975,190
SOLVENT RECOVERY

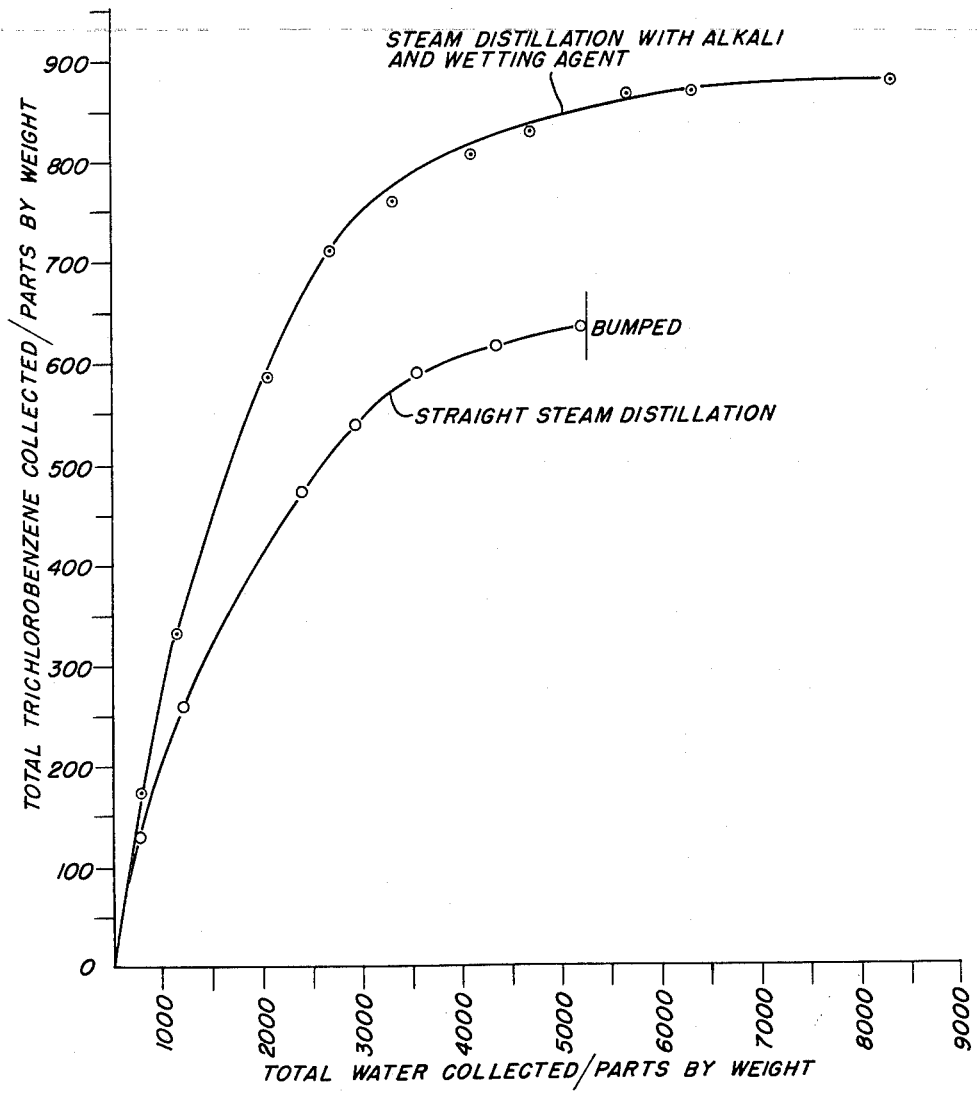

George Leathwhite Roberts, Jr., and Justin Alan McSheehy, Somerville, and Herbert Soffer, Fanwood, N.J., assignors to American Cyanamid Company, New York, N.Y., a corporation of Maine Filed Dec. 28, 1956, Ser. No. 631,084

11 Claims. (Cl. 260—314.5)

This invention relates to the recovery of a water-immiscible organic liquid which has been used in the synthesis of a water-insoluble and organic-liquid-insoluble organic pigment by forming an emulsion of the pigment, the organic liquid, and water, and steam distilling off the organic liquid, condensing the distillate, and separating the organic liquid layer from the water layer, thereby recovering the organic liquid; and separating from the residual aqueous system the organic pigment in purified form as a finely-divided material. The recovery of the solid organic pigment in a commercially useful form is an important and essential part of the invention.

It also relates to a process for recovering solid organic pigments from a water-immiscible organic liquid, in which the pigments are insoluble, employed in the synthesisis of these pigments, which comprises emulsifying the reaction mixture with water in the presence of a purifying agent and an emulsifying agent, steam distilling off the organic liquid, and isolating the newly synthesized organic solid.

The designation "water-immiscible liquids" refers to liquids which with water forms a two phase system. In other words, the organic liquid is not soluble or only slightly soluble in the water layer and vice versa. Examples of such liquids are benzene, substituted benzenes such as halobenzenes including monochloro, dichloro, and trichlorobenzene, alkyl benzenes, such as toluene, xylene, and tertiary butyl benzene, other aromatic solvents including polycyclic solvents such as naphthalene, anthracene, the halo or alkyl derivatives of these polycyclic aromatics, the nitro derivatives thereof (preferably, of course, for safety the non-explosive ones) such as nitrobenzene, amine derivatives such as aniline, phenylene diamine, naphthylamine, diphenylamine, or mixtures of these in which the substituents are on the same or different nuclei or rings, including toluidine and dimethyl aniline; aliphatic hydrocarbons, including dodecane, hexadecane, cycloaliphatics such as decalin, unsaturated aliphatic hydrocarbons, such as dodecene, hexadecene, and the amino or nitro derivatives of these aliphatic hydrocarbons such as dodecylamine, halogenated hydrocarbons, such as octylchloride, etc. These are all inert, water-insoluble, steam volatile organic solvents, and when used as solvents for the formation of pigments, and if volatile and liquid under steam distillation conditions, may be used in accordance with their invention. When a solid pigment is present, at least three-phases are involved.

In the past it has been customary to form many organic pigments in the presence of water-insoluble liquids in which certain of the reactants are soluble but in which the final pigment product is not soluble. The reaction product resulting from the synthesis contained not only the desired pigment and the water-immiscible liquid used as a solvent but also other products of the reaction and by-products of the reaction, and impurities contained in the various starting materials, and reaction products resulting from the side reactions of the various impurities with other components present. In the past the complex reaction mixture has been normally filtered to separate the desired pigment from the water-immiscible liquid soluble reaction products and the water-immiscible liquid. This process has disadvantages in that many filter presses are not tight and hence there are losses. Liquids, which are frequently inflammable or toxic, escape into the filter press room creating health and fire hazards. Additionally pressing removes only part of the water-immiscible liquid which means that addditional steps must be used to remove the remaining organic liquids. Further the organic liquids when separated are contaminated with soluble impurities necessitating additional processing steps to recover the solvent for re-use.

It is frequently not even practical to dump the residual water-immiscible organic reaction liquid into a sewer, because the water-immiscible organic liquid pollutes streams and is a health hazard. Frequently, the water-immiscible organic liquids if dumped are a fire hazard. Furthermore, the water-immiscible organic liquids are usually expensive, so the separation and recovery is a distinct economic advantage.

Steam distillation of the water-immiscible organic liquid from the reaction mixture has been impractical because there is a distinct tendency to "bump" in steam distillations of these reaction mixtures. The reaction mixture frequently foams and in many instances has a particular point at which such bumping routinely occurs that part of the solid pigment is lost into the overhead, thus causing a loss of pigment, and contamination of the distillate. The problems of bumping and contamination of distillate as well as foaming are so severe that steam distillation procedures of such reaction mixtures have been looked upon with disfavor even though theoretically advantageous.

Compton, U.S. Patent 2,668,171, teaches the recovery of copper phthalocyanine from a reaction mass after synthesis from phthalic anhydride, urea and cupric chloride in the presence of trichlorobenzenes. In said Compton patent, the reaction mass is treated with alkali and washed several times to remove impurities before steam distillation. This patent recognizes the bumping problem during steam distillation in a phthalocyanine synthesis.

By this invention it is found that by forming an emulsion such as by having a surface active agent present in the system during steam distillation of the water-immiscible solvent from a reaction mass from the synthesis of a solvent-insoluble pigment in a water-immiscible-organic liquid, so that the composition forms an emulsion, the steam distillation is greatly facilitated. The surface active agent may be added to the pigment water-immiscible organic solvent system before the addition of water, or after the addition of water, or it may be added in the water. Similarly the water may be mixed with the water-immiscible liquid pigment mass, or the water may be introduced solely or principally as steam.

The accompanying drawing shows comparable distillation rates from Examples 1 and 2 without and with a surface active agent.

Conveniently the steam may be formed in situ by adding sufficient water and heating the kettle containing the reaction mixture, or the steam may be introduced as such and the relative quantities of steam, added water, and heat flow, adjusted so that the stripping kettle has a preferred ratio of water, to pigment, to water-immiscible organic liquid. The condensate may be split into two layers, and the aqueous phase reused as feed to the stripping kettle. Conventional sizes of equipment and ratios are generally preferred.

The emulsion itself may be of either the water-in-oil or the oil-in-water type. Frequently if only a small amount of water is added, or with the initial introduction of steam, a water-in-oil emulsion is formed. If a large quantity of water is initially introduced, and particularly if the surface active agent is dissolved in the water initially, an oil-in-water emulsion may be formed. In some instances the type of emulsion is effected by the choice of wetting agent. In some instances a water-in-oil emulsion is formed initially which, as the water-immiscible organic liquid is distilled, and the relative ratios of water-immiscible organic liquid and water changes to increase the relative proportion of water, reverses to form an oil-in-water emulsion. In any of these instances the water-immiscible organic liquid is easily and completely steam distilled—that is stripped from the pigment-organic-liquid system by contacting with steam.

Obviously the pressure in the system may be varied over a wide range from either a low pressure for temperature sensitive organic liquids or pigments to comparatively high pressures for the more insensitive liquids and pigments. Conveniently, a pressure of slightly above atmospheric in the kettle is most convenient, as then the overhead may be condensed and the distillate allowed to collect in a receiver which is vented to the atmosphere.

The process of this invention has many advantages among which are that the recovered water-immiscible organic liquid is separated in a comparatively pure state and is ready for re-use with a minimum of additional treatment. Usually, the recovered liquid, as separated from the aqueous layer in the receiver, may be used directly in the subsequent synthesis by introducing it into the reaction kettle where needed. The cost of an additional rectification or drying or other operation is reduced or eliminated. The health, explosion and fire hazards resulting from a loss of solvent are minimized or eliminated.

The rate of steam distillation of the water-immiscible organic liquid from an emulsified system is more rapid than from an unemulsified system. The amount of steam or heat required for the recovery of the water-immiscible organic liquid is materially reduced. From a study of the thermodynamic principles involved in the distillation of two immiscible liquids, each liquid has a finite vapor pressure (P) at any given temperature. When the temperature is raised to such a point that $$P_a + P_b = P_t \quad (1)$$

where:

$P_a$ = vapor pressure of liquid $a$
$P_b$ = vapor pressure of liquid $b$
$P_t$ = external pressure exerted on the system (normally, atmospheric pressure)

the component liquids vaporize such that the ratio of the number of moles of each liquid in the vapor is directly proportional to its component part of the total vapor pressure exerted by the system.

Therefore, the weight ratios of vapors may be calculated by the following equation, as discussed by S. Glasstone, "Thermodynamics for Chemists," D. Van Nostrand Co., Inc., New York, 1949, chapter X et seq.:

$$\frac{W_a}{W_b} = \frac{M_a}{M_b} \times \frac{P_a}{P_b} \quad (2)$$

where:

$W_a$ and $W_b$ are weights of vapors of $a$ and $b$ respectively
$M_a$ and $M_b$ are molecular weights of $a$ and $b$
$P_a$ and $P_b$ are vapor pressures of $a$ and $b$, and are sufficiently accurate as a first approximation The principles expressed in this equation are used quite extensively in commercial steam distillations and as long as only two liquids are used, the experimental results agree quite well with the predictions of the theory.

To consider the change from the liquid to the vapor phase of a single component by applying the conditions of isothermal equilibrium, there can be written (at constant pressure) according to Glasstone $$dF = dH - TdS \quad (3)$$

where:

$dF$ = change in free energy of the system
$dH$ = change in heat content or enthalpy of the system
$T$ = absolute temperature (° K.)
$dS$ = change in entropy of the system and from applying the laws of thermodynamics, the conclusion appears that $$dF_{T,P} = 0$$

for this process at equilibrium. Likewise in a system of two components, the free energy is replaced by the partial molar free energy (chemical potentials) and here the sums of all the chemical potential changes must also equal zero.

If there now be introduced into the mixture of two immiscible liquids a solid which is only sparingly soluble in either liquid, but which has an affinity for liquid $b$ greater than that of liquid $a$, there is possible the fact that attractive forces between liquid $b$ and the solid are such that liquid $b$ becomes adsorbed on the solid. If the solid has appreciable surface the equation for free energy becomes:

$$dF = dH - TdS + \gamma \Delta \sigma \quad (4)$$

where:

$dF$, $dH$, $T$, and $dS$ are as before
$\gamma$ = free interfacial energy between liquid $b$ and solid
$\Delta \sigma$ = interfacial area between solid and liquid $b$ The only significant difference between Equations 3 and 4 is the term $\gamma \Delta \sigma$. Therefore, it can be concluded that this energy must affect the transfer of liquid $b$ into the vapor phase (a lowering of vapor pressure is obtained).

When an emulsifying, dispersing, or surface active agent is introduced into the system, the interfacial free energy is reduced and the agent is preferentially adsorbed on the solid surface. Thus, more liquid will be released from the surface and its energy of vaporization will be reduced to nearly the theoretical limit.

The wetting agent as used in this invention displaces the organic liquid from the surface of the pigment particles, which has the advantage of rendering the distillation of the water-immiscible organic liquid more rapid and more effective.

The quantity of wetting agent should be such that the resultant system has a workable consistency. A more highly emulsified system usually becomes thicker and an increase in consistency has a deleterious effect on heat transfer coefficients and ease of mixing and agitation.

The amount of the water-immiscible organic liquid recovered is increased by a considerable amount, frequently as much as one-third. Part of this increased recovery is due to the absence of "bumping" in the system resulting from the characteristics of the emulsion system. Not only does this permit the recovery of a distillate of increased purity, free from pigment particles such as are carried over with the overhead in the non-emulsified system, but the distillation may be carried out long enough to recover a larger portion of the organic liquid. Because the water-immiscible organic liquid is not bound on the surface of the pigment, it comes over nearly completely and may be therefore recovered with a minimum of loss.

Because the pigment is freed from an absorbed layer of the organic liquid, any materials present in the aqueous phase can more easily react with materials present on or with the pigment particles. Thus, at the same time as the distillation occurs, a purifying agent, usually a hydrolysis inducing material such as caustic or acid may be added to the system, is soluble in the aqueous phase, and attacks impurities present. Many of the impurities from the pigment synthesis are either water soluble in the presence of an acid or a base or are hydrolyzed to materials which are water soluble under these conditions. Solubilization direct or induced by hydrolysis markedly reduces the amount of contaminants present in the pigment particles and when the pigment particles are filtered from the aqueous phase at the completion of the steam distillation, the water soluble impurities are washed away leaving the pigment in such a condition of purity that subsequent operations are minimized. Some of the impurities are volatile and collect in the aqueous distillate layer.

The water-soluble hydrolytic purifying agents wet the surface of the pigment solids more easily when the solvent phase is emulsified than when the surface of the pigment particles is covered by the water-immiscible organic liquid only. Without the presence of a wetting agent the organic liquid must first be removed from the surface of the pigment particles before the water soluble purifying agent can be effective. The latter point is critical since solids which have been wet with water-immiscible organic liquids usually retain an invisible film of that water-immiscible organic liquid even when they have been isolated and subdivided. Consequently, it is difficult to remove impurities from these pigment particles by treatment with water-soluble hydrolytic purifying agents alone. When a wetting agent is present which displaces the water-immiscible organic liquid from the surface of the pigment particles and permits the water-soluble hydrolytic purifying agents to attack impurities, a considerably purified product is obtained. The results obtained are consistent with the premise that the pigment particles are softer and more readily permeated by the aqueous phase before the water-immiscible organic liquid is first removed therefrom. Hence by changing to an aqueous contacting phase before drying, superior results are obtained.

The increase in purity may run at least as high as 13%, as for example in certain phthalocyanine syntheses.

Another important advantage of the emulsion stripping process is the reduction in steam consumption. Not only is the water-immisible organic liquid more thoroughly removed, but the amount of steam required may be reduced by as much as 25%. As set forth in the above discussion on free energy, the energy which would otherwise be required to remove the water-immiscible organic liquid from the surface of the pigment particles can effectively be used in distilling that liquid because the pigment is preferentially wet by the aqueous phase.

The nature of the purifying agents employed depends somewhat on the nature of the contaminants present. In the synthesis of copper phthalocyanines particularly from phthalic anhydride, urea and a copper salt in the presence of a catalyst such as ammonium molybdate, with trichlorobenzene as the water-immiscible organic liquid, the impurities associated are readily attacked by an alkaline hydrolysis-inducing agent particularly the alkali metal hydroxides such as sodium hydroxide or potassium hydroxide and nitrogenous bases such as ammonium hydroxide, triethanolamine, ethylene diamine, hexamethylbiguanide, trimethyldodecyl ammonium hydroxide, etc. This latter compound serves both as an emulsifying agent and a purifying agent. The emulsifying agent can be formed in situ.

Acid hydrolytic agents which are effective include the mineral acids such as sulfuric acid, hydrochloric acid, nitric acid, and phosphoric acid as well as strong organic acids such as acetic acid. Sulfuric acid is particularly economically advantageous.

The surface active agent may be anionic, non-ionic, cationic, amphoteric or a mixture. The ionic agents are particularly effective in the emulsification. With the alkaline purifying agents, it is convenient to use an anionic surface active agent such as the alkyl sulfosuccinates, usually supplied as an alkali metal salt, such as sodium di-(ethylhexyl)sulfosuccinate, sulfated alkanols having from 10 to 18 carbon atoms, etc. The non-ionic agents, such as alkyl aryl polyether alcohols, are very useful in an alkaline system also.

In the presence of the acidic hydrolytic purifying agents, the cationic emulsifiers are particularly useful. These include cetyl pyridinium sulfate, trimethyldodecylammonium chloride, etc. The present invention is not restricted to any specialized list of surface active agents. To reduce the length of this specification, rather than list each by name there is hereby incorporated by reference a particularly complete and up-to-date list of wetting and surface active agents which appears in the book "Synthetic Detergents," volume 3, 1955, John W. McCutchen, Inc., 475 Fifth Avenue, New York 17, New York.

As an alternative procedure the pigment may be separated from both the organic liquid and soluble impurities in a filter press, and may have many of the advantages of emulsifying steam stripping obtained by passing steam through the filter press to steam strip the solvent from the surfaces of the pigment in the filter press in the presence of a surface active agent. This method has the advantage of separating the organic liquid soluble impurities from the pigment in the initial filtration step as well as removing water-soluble impurities during the stripping and subsequent water washing operations. Solvent recovery though is more complicated.

Among the pigments that may be purified and separated from the water-immiscible organic liquid in which they are produced are the various phthalocyanines including the metallic and halophthalocyanines and especially copper phthalocyanine and the various copper halo phthalocyanines; salicyloylamidoanthraquinones such as are prepared by condensing a salicylic acid and an anthraquinone in solvents such as mononitrobenzene; other anthraquinone derivatives as, for example, benzanthronylaminoanthraquinone and 1-amino-4-benzoylaminoanthraquinone; pigments from vat dyes such as di-bromoisodibenzanthrone, bz-1-bromobenzanthrone, dichloroisodibenzanthrone, 16,17-dimethoxy-dibenzanthrone dibenzanthrone, oxynitrodibenzanthrone, benzanthrone, 5,5',7,7'-tetrabromoindigo and 1,1'-dianthrimide; and chlorinated indanthrone.

In addition to the advantages in processing, the presence of the surface active agent tends to cause the pigment to be produced in a softer and more friable form than in the absence of the surface active agents. It would seem that the emulsification causes the pigment to be so intimately dispersed in the aqueous phase that the particles do not agglomerate to form hard pellets such as otherwise frequently occurs. For example, some pigments form such hard pellets that a grinding procedure is necessary to fracture them; and the particles contain water-immiscible organic liquid which has been locked into the body of the pellet. By using the present wetting agents there are no pellets formed and a superior pigment is formed. The increased purities are such that subsequent operations including acid pasting are at times eliminated and a simple acid conditioning step will give the results which could otherwise be only achieved by acid pasting.

It is to be pointed out that the prior processes frequently would give pigments which were satisfactory only after subsequent processing and by using the present process either an equally good pigment is produced more economically or a superior pigment is produced or both. The subsequent conditioning treatments are more effective with the present superior grade of crude.

Without being in any way exhaustive in the treatment thereof, certain details of the present invention are shown in the following examples in which parts are by weight unless otherwise stated.

EXAMPLE 1

*No surface active agent*

A crude copper phthalocyanine, synthesized as in Example 3, containing 130 parts of real copper phthalocyanine and 880 parts of trichlorobenzene is mixed with 840 parts of water and charged to a distillation kettle equipped with an agitator and a steam leg. Steam is injected into the kettle at such a rate that foaming does not occur, and the overhead is condensed and collected. The following fractions are obtained in a typical run:

TABLE 1

| Interval | Individual Parts | | Ratio, TCB:H₂O | Total, H₂O | Total, TCB | Ratios of Totals, TCB:H₂O |
| --- | --- | --- | --- | --- | --- | --- |
| | H₂O | TCB | | | | |
| 1 | 580 | 130 | 0.224 | 580 | 130 | 0.224 |
| 2 | 640 | 130 | 0.203 | 1,220 | 260 | 0.213 |
| 3 | 1,180 | 214 | 0.154 | 2,400 | 474 | 0.198 |
| 4 | 540 | 65 | 0.093 | 2,940 | 539 | 0.180 |
| 5 | 620 | 52 | 0.065 | 3,560 | 591 | 0.166 |
| 6 | 790 | 26 | 0.025 | 4,350 | 617 | 0.142 |
| 7 | 850 | 19.5 | 0.018 | 5,200 | 636.5 | 0.122 |
| | ¹610 | | | | | |

¹ Bumps over and run is ended.
TCB—Trichlorobenzene.

After distillation, the copper phthalocyanine is filtered from the residual aqueous layer, washed with 1000 parts of 5% aqueous sodium hydroxide, then washed acid free and dried. A yield of 161 parts of material 79% pure is obtained.

EXAMPLE 2

Emulsion steam distillation

A duplicate experiment is conducted using the same quantities of phthalocyanine crude, trichlorobenzene and added water as in the preceding experiment in the same type of kettle. To this mixture is added 9.5 parts of 25% aqueous sodium di-(2-ethylhexyl) sulfosuccinate (Aerosol OT) and 44 parts of solid sodium hydroxide pellets. The mixture is agitated to aid emulsification, then steam distilled at approximately the same rate as in Example 1. The following results are obtained in a typical run:

TABLE 2

| Sample | Individual Parts | | Ratio, TCB:H₂O | Totals, H₂O | Totals, TCB | Ratios of Totals, TCB:H₂O |
| --- | --- | --- | --- | --- | --- | --- |
| | H₂O | TCB | | | | |
| 1 | 580 | 174 | 0.300 | 580 | 174 | 0.300 |
| 2 | 570 | 159.5 | 0.280 | 1,150 | 333.5 | 0.290 |
| 3 | 920 | 254 | 0.276 | 2,070 | 587.5 | 0.284 |
| 4 | 625 | 123 | 0.198 | 2,695 | 710.5 | 0.267 |
| 5 | 625 | 51 | 0.081 | 3,320 | 761.5 | 0.229 |
| 6 | 775 | 36 | 0.046 | 4,095 | 807.5 | 0.197 |
| 7 | 600 | 22 | 0.036 | 4,695 | 829.5 | 0.177 |
| 8 | 975 | 36 | 0.036 | 5,670 | 865.5 | 0.153 |
| 9 | 655 | 4.3 | 0.006 | 6,325 | 869.8 | 0.138 |
| 10 | 2,000 | 7.3 | 0.003 | 8,325 | 877.1 | 0.105 |

TCB—Trichlorobenzene.

Following distillation the residue is filtered and washed alkaline free. It is dried at 60° C. 150 grams real phthalocyanine is obtained having a purity of 87%.

The accompanying drawing shows the amount of solvent which is distilled over in these two examples. It will be noted that the amount of trichlorobenzene which is distilled over with the added wetting agent is markedly greater than that which is distilled over by the simple steam distillation. For instance, the first 580 parts of water to come over in the absence of an emulsifying agent and caustic carried over a total from 130 parts of trichlorobenzene. In the presence of the emulsifying agent and alkali 170 parts are carried over. This is an increase of 30% in the initial rate of distillation.

The total amount of trichlorobenzene which is recovered before the solution bumps is about 636 parts in the absence of an emulsifying agent and caustic and a total of 877 parts in the presence of these agents. This is an increase of nearly 38% in the recovery of the solvent. Part of this increase is due to the fact that no bumping occurs so that all of the solvent may be recovered and part is due to the superior recovery conditions in which none of the solvent is bound up in pellets in the pigment.

The increase in the recovery of the solvent markedly decreases the consumption of solvent and hence the cost of the product.

Certain impurities are made volatile by the action of the caustic and distilled over with the steam and trichlorobenzene. However, these impurities are water-soluble and are removed when the solvent is separated from the aqueous layer. The solvent as recovered from the emulsified steam distillation is of such purity as to be immediately usable again in the subsequent synthesis of additional phthalocyanine.

The phthalocyanine recovered in Example 1 in the absence of a surface active agent in a typical run analyzed 79% pure and a total of 127 parts real phthalocyanine is recovered. In the presence of an emulsifying agent and caustic the recovered phthalocyanine after being filtered from the aqueous suspension in the distillation kettle and dried under the same conditions is 86% pure and a total of 129.5 parts of real phthalocyanine is recovered.

EXAMPLE 3

Copper phthalocyanine crude synthesis

A copper phthalocyanine crude is synthesized by charging to an autoclave 5.6 parts of trichlorobenzene, 0.088 part of monochlorobenzene, 1 part phthalic anhydride and 0.33 part of anhydrous copper sulfate. A slurry of 0.0066 part of molybdic oxide in 0.026 part of monochlorobenzene is added to the autoclave. The mixture is heated to 55° C. and then 1.36 parts of urea is added. The autoclave is closed and heated to a temperature of 140° C. over a period of 75 minutes with stirring. The temperature is raised to 200° C. over the next 90 minutes and held under 30 lbs. per square inch gauge pressure for 3 hours while maintaining the temperature between 200 and 215° C. At the end of this time heating is discontinued and the autoclave cooled and the pressure reduced to atmospheric. The solvent which escapes during the venting is condensed and recovered. 1.56 parts additional of cold trichlorobenzene is added to assist in the cooling.

EXAMPLE 4

Emulsion press stripping

To the slurry from Example 3 as soon as it is cooled to 100° C. is added 0.067 part of 25% sodium di-(ethylhexyl) sulfosuccinate in an aqueous slurry and 1.5 parts of water. The water is added with stirring over a period of about 10 minutes. The emulsion is stirred for an additional 10 minutes then 0.07 part of solid sodium hydroxide is added to the slurry. The mixture is held at 90° C. for half an hour to permit hydrolysis of impurities, then filtered in a filter press. The cake in the filter press is washed with water for 1 hour and then stripped with steam for 12 hours. The stripping steam is condensed to recover the solvent trichlorobenzene. The trichlorobenzene is separated from the aqueous layer and is ready for reuse. It contains some monochlorobenzene which is, of course, needed for the next batch. Theoretically all of the trichlorobenzene may be recovered. In large scale plant practice about 80% is recoverable. The press cake is washed for 1 hour with water then with 0.27 part real ammonia as a 3% solution, to remove any residual cooper. The cake is washed alkali free. Then the cake is dried at about 80° C. yielding a crude which analyzes between 85 and 90% phthalocyanine.

This crude may be acid conditioned or ground or otherwise treated as may be desired.

EXAMPLE 5

Kettle stripping

A batch of phthalocyanine crude is prepared as in Example 3. To the slurry is added 0.058% parts of 25% sodium di-(ethylhexyl) sulfosuccinate slurry. To the mixture with stirring over a period of about 20 minutes is added with vigorous stirring 52.7 parts of water. It is preferable that the water be pure as any non-volatile impurities in the water may remain in the final pigment. To this emulsion is added 0.263 part of solid sodium hydroxide. As soon as dissolved the mixture is heated in a stripping kettle by the application of external heat. In this steam distillation the steam is formed in the kettle by the addition of heat. Additional water is added as necessary to maintain the volume. For convenience, the aqueous condensate is recycled and used as the feed water. A slightly positive air pressure may be introduced above the liquid level if foaming occurs. The distillation is continued until no more trichlorobenzene is being collected. The trichlorobenzene in the receiver is separated from the aqueous layer and is ready for reuse. Theoretically all of the trichlorobenzene may be recovered, as in laboratory experiments. In plant practice from 85% to 90% is recoverable. Without the emulsification, but under otherwise comparable conditions, the maximum recovery is about 65%.

The copper phthalocyanine pigment is separated on a filter press and is washed with 0.27 part real ammonia as a 3% solution. Then the copper phthalocyanine is washed until alkali free and dried. 80° C. is a convenient drying temperature. A crude of from 85 to 90% purity is obtained which may be acid conditioned, salt ground, or otherwise conditioned for use as a pigment. The recovery is nearly quantitative.

EXAMPLE 6

Steam injection stripping

The procedure of Example 5 is followed except that instead of heating the stripping kettle a steam leg is inserted and steam is introduced supplying heat to the reaction vessel and removing the solvent. Additional heat is supplied to the reaction vessel if necessary to keep the volume from becoming excessive. About 85 to 90% of the solvent is recovered in plant scale operations.

Whereas the final slurry may be washed with ammonia as in the preceding example, it is convenient to pump the pigment slurry into a lead lined tub containing sufficient sulfuric acid to form a 33⅓% sulfuric acid concentration. This slurry is heated to 90° C. and held at 90° C. for about 5 hours then diluted to a final concentration of 17% sulfuric acid at 70° C. by adding ice and water. This slurry is then filtered, the press cake washed free of acid, and then washed with 0.27 part real ammonia as a 3% aqueous solution, then washed alkali free and the cake dried. The resulting crude is from 95 to 100% pure, and chemically is in condition for use as a pigment. Physically, particle sizes are larger than is normally desired and size reduction is usually required.

EXAMPLE 7

To 580 grams of water is added 13.9 grams of 25% sodium di-(ethylhexyl) sulfosuccinate, as the commercial product in water and diethyleneglycolmonoethylether, and 48 milliliters of 50% aqueous sodium hydroxide. To this mixture is added slowly with agitation 580 grams of a slurry containing 64 grams real copper phthalocyanine in trichlorobenzene prepared as in Example 3.

A dispersion of the phthalocyanine in a homogeneous emulsion is obtained. The resultant emulsion is steam distilled as described in Example 5. 475 grams of trichlorobenzene is recovered. After the distillation of the trichlorobenzene, the residual suspension of copper phthalocyanine is filtered on a Büchner funnel, washed with 720 grams of 3% aqueous ammonia, washed alkali free, and dried. A yield of 63 grams of real copper phthalocyanine, as a 90% pure product is obtained.

EXAMPLE 8

To 580 grams of water is added 13.9 grams of 25% aqueous sodium di-(ethylhexyl) sulfosuccinate, and 48 milliliters of 50% sodium hydroxide. To this mixture 450 grams of a slurry of copper phthalocyanine in trichlorobenzene prepared as in Example 3 is added with agitation. An emulsion is formed with a good dispersion of copper phthalocyanine. The resultant slurry is steam distilled by heating the mixture, condensing the overhead, separating the aqueous layer, and feeding the aqueous layer back into the distilling mixture. 365 grams of trichlorobenzene is recovered. The residual suspension of copper phthalocyanine is filtered, and washed as in Example 7. A yield of 47.5 grams real copper phthalocyanine is obtained, which is 95% pure.

EXAMPLE 9

Oil-in-water emulsion

To 580 grams of water, is added 4.6 grams 25% commercial sodium di-(ethylhexyl) sulfosuccinate, then slowly is added 250 grams of a slurry of copper phthalocyanine in trichlorobenzene prepared as in Example 3, with agitation. The mixture is stirred while heating for 15 minutes. As contrasted with the prior examples, an oil-in-water emulsion is formed. After a 15-minute stirring period, 48 milliliters of 50% sodium hydroxide solution is added to the emulsion. The emulsion does not break. Steam distillation is carried out as described in Example 8. 365 grams of trichlorobenzene are recovered. After washing as described in Example 8, 48 grams real phthalocyanine is obtained which is 91% pure.

EXAMPLE 10

Cationic agent 200 grams of a slurry of copper phthalocyanine in trichlorobenzene prepared as in Example 3 is stirred in a 500 milliliter three-necked flask equipped with a stirrer, steam injection line and condenser. To the slurry is added 1.6 grams real dodecyl trimethyl ammonium chloride, using a commercially available dilution. The resultant mixture is heated to 90° C. with agitation. 143 grams water at 80° C. is added dropwise to the slurry over a 5-minute period. An emulsion is formed. To the resultant emulsion 7.5 grams of sodium hydroxide is added. The emulsion obtained is improved by the addition of the sodium hydroxide. The resultant emulsion is stirred at 90–95° C. for ½ hour then steam distilled. After steam distillation as described in Example 5 and purification, 23.2 grams of dry copper phthalocyanine of a purity of 98% is obtained. 170 grams of trichlorobenzene is recovered.

EXAMPLE 11

Non-ionic agent 200 grams of crude slurry containing 24 grams copper phthalocyanine in trichlorobenzene prepared as in Example 3 is slowly stirred in a 500 milliliter, three-necked flask. To this slurry 1.6 grams of alkyl phenoxy polyoxyethylene ethanol (from nonyl phenol with about 4½ ethylene oxide groups per molecule) is added. Over 5 minutes 143 grams of water at 80° C is added with agitation. An emulsion is formed. 7.5 grams of sodium hydroxide is then added to the emulsion, and the mixture stirred for ½ hour, then steam distilled. After steam distillation, and recovery, as described in Example 5, copper phthalocyanine 89% pure is obtained. The yield is 23.0 grams, real. 170 grams of trichlorobenzene is recovered.

EXAMPLE 12

Steam stripping of 1,1'-dianthrimide in nitrobenzene

A 3 liter flask is fitted with a thermometer and stirrer, a steam injection line and a condenser. 750 milliliters of water and 5 grams of a polyoxyethylene sorbitol lanolin derivative sold as G-1425 are mixed in the flask. To this solution is added 75 grams of a press cake containing 23.6 grams of real 1,1'-dianthrimide in a mononitrobenzene press cake. The resultant slurry is stirred until a smooth emulsion is formed; then steam is introduced, and the mixture steam distilled until no more mononitrobenzene remains in the slurry. The slurry of pigment and water and emulsifying agent is then filtered, washed free of emulsifying agent and dried. The product is in an excellent powdery condition and contained no pellets, or lumps, and has no odor of mononitrobenzene.

The stripping time is 1 hour 55 minutes, with an excellent recovery of the nitrobenzene.

A control experiment conducted without the surface active agent contained many hard pellets.

Similar distillations are run with other wetting agents, the following times being required to strip the nitrobenzene from the press cake for typical surface active agents:

| | |
|---|---|
| Sorbitan trioleate (Span 85) | 2 hours, 35 minutes. |
| Stearyl-dimethyl-benzyl-ammonium chloride (Triton K–60) | 2 hours, 30 minutes. |
| The polymerized sodium salt of substituted benzioc alkyl sulfonic acid (sold as Daxad #23) | 2 hours, 10 minutes. |
| Modified phthalic glycerol alkyl resin (sold as Triton B 1956) | 2 hours, 30 minutes. |
| Alkyl phenol polyglycol ether (Neutronyx) | 2 hours, 25 minutes. |
| Sodium sulfate of a mixture of fatty alcohols, about 12 carbon chain length (Duponal WA) | 2 hours, 30 minutes. |
| Sodium salt of formaldehyde naphthalene condensation sulfonate (Tamol) | 2 hours, 20 minutes. |
| Control—no wetting agent hard pellets were obtained, and the mixture bumped during the first hour | 2 hours, 45 minutes. |

Other commercial wetting agents may be used, many of which are identifiable by trademark only.

EXAMPLE 13

17 milliliters of a slurry of 1-(3-chlorosalicyloyl-amido)-anthraquinone in mononitrobenzene is stirred in a 250 milliliter, three-neck flask, equipped with a condenser, agitator, and steam injector. 1.6 grams of a 50% solution of N-alkyl tri-methyl ammonium chloride (Arquad 12) and 1.0 gram nonyl-phenoxy polyoxyethylene ethanol (Igepal CO–430) are added to the slurry. Stirring is commenced, then 75 milliliters of water at 80° C. containing 2.5 grams of 98% sulfuric acid is added slowly. The resultant emulsion is stirred, while being heated by the injection of steam. The mixture is steam distilled until no mononitrobenzene remains in the flask. At the completion of distillation, 100 milliliters of water is added to the flask and the resultant emulsion is allowed to cool to room temperature. The slurry is then filtered, washed acid free, and dried at 60° C. until only a trace of moisture remains. 12.7 grams of a crude pigmentary product is obtained. The distillation is smooth, free from bumping, and excellent recoveries are obtained. The pigment is of smooth texture, free from pellets and lumps.

Obviously many variations in rates of treatment and conditioning may be used based on the size of batches and equipment available. Such variations are well understood by those skilled in the industry, and such variations are within the scope of the appended claims.

We claim:

1. A process for the recovery of a purified water-immiscible organic liquid selected from the group consisting of nitrobenzene and trichlorobenzene used in the synthesis of a metal phthalocyanine pigment which comprises treating a slurry of said metal phthalocyanine and said water-immiscible organic liquid with a surface active agent and water to form an emulsion, while introducing of hydrolytic agent selected from the group consisting of alkali metal bases and nitrogenous bases into the aqueous phase of the emulsion, contacting the emulsion with steam, steam distilling off the said organic liquid, condensing the distillate, stratifying the distillate and separating the layer of purified said organic liquid.

2. The process of claim 1 in which the surface active agent is an anionic agent.

3. The process of claim 1 in which the surface active agent is a cationic agent.

4. The process of claim 1 in which the surface active agent is a non-ionic agent.

5. A process for the recovery of a newly synthesized metal phthalocyanine pigment from a water-immiscible organic liquid selected from the group consisting of nitrobenzene and trichlorobenzene in which said pigment has been synthesized which comprises treating a slurry of said pigment in said organic liquid with a surface active agent and water to form an emulsion while introducing a hydrolytic agent selected from the group consisting of alkali metal bases and nitrogenous bases, contacting the emulsion with steam, steam distilling off the said organic liquid, condensing the overhead to form a distillate, stratifying the distillate, separating and recovering the layer of purified said organic liquid, and separating the metal phthalocyanine pigment from the residual undistilled aqueous phase.

6. The process of claim 5 in which the steam is formed in situ.

7. The process of claim 5 in which externally generated steam is introduced into the water-organic liquid-pigment emulsion.

8. The process of claim 5 which includes the step of separating the pigment from the water-organic liquid-pigment emulsion in a filter press, and stripping the organic liquid from the pigment in the filter press by passing steam therethrough, collecting the effluent vapors, condensing said vapors, and separating the organic liquid layer therefrom.

9. In a process for the preparation of copper phthalocyanine by heating and thereby reacting phthalic anhydride, urea and copper sulfate in an organic liquid consisting principally of trichlorobenzene to form copper phthalocyanine and after the synthesis of the copper phthalocyanine, steam distilling of the trichlorobenzene from the reaction mixture by the injection of steam; the combination therewith of the steps of adding sodium di-(2-ethylhexyl)-sulfosuccinate, sodium hydroxide and water to the reaction mixture, agitating to form an emulsion, hydrolyzing the associated impurities by the hydrolytic action of the sodium hydroxide as an alkaline hydrolytic agent before the steam distillation of trichlorobenzene from the emulsion, and after said distillation separating and recovering the layer of trichlorobenzene in the distillate and reusing said recovered trichlorobenzene in a subsequent synthesis, and separating the copper phthalocyanine from the residual aqueous undistilled layer and washing until alkali free.

10. The process of claim 9 in which the copper phthalocyanine separated from the residual aqueous undistilled layer is washed with aqueous ammonia, and the copper phthalocyanine, after being washed alkali free, is dried.

11. In a process for the preparation of copper phthalocyanine by heating and thereby reacting phthalic anhydride, urea and copper sulfate in a water-immiscible organic liquid selected from the group consisting of nitrobenzene and trichlorobenzene to form copper phthalocyanine and after the synthesis of the copper phthalocyanine, steam distilling of said organic liquid from the reaction mixture by the injection of steam; the combination therewith of the steps of adding a cationic wetting agent and a hydrolytic agent selected from the group consisting of alkali metal bases and nitrogenous bases, and water to the reaction mixture, agitating to form an emulsion, hydrolyzing the associated impurities by the hydrolytic action of said hydrolytic agent before the steam distillation of said organic liquid from the emulsion, and after said distillation separating and recovering the said organic liquid in the distillate, and separating the copper phthalocyanine from the residual aqueous undistilled layer and washing until alkali free.

References Cited in the file of this patent

UNITED STATES PATENTS

| | | |
|---|---|---|
| 2,359,737 | Lacey et al. | Oct. 10, 1944 |
| 2,485,168 | Rintelman | Oct. 18, 1949 |
| 2,486,304 | Loukomsky | Oct. 25, 1949 |
| 2,524,672 | Lecher et al. | Oct. 3, 1950 |
| 2,540,775 | Bouillard et al. | Feb. 6, 1951 |
| 2,556,729 | Stallman | June 12, 1951 |
| 2,645,643 | Gottlieb | July 14, 1953 |
| 2,668,171 | Compton | Feb. 2, 1954 |
| 2,833,782 | Stryker et al. | May 6, 1958 |
| 2,833,784 | Ehrich | May 6, 1958 |

OTHER REFERENCES

Schwartz et al.: "Surface Active Agents and Detergents," Interscience, N.Y., vol. 2 (1958), pages 723–4.

UNITED STATES PATENT OFFICE
CERTIFICATE OF CORRECTION

Patent No. 2,975,190                               March 14, 1961

George Leathwhite Roberts, Jr., et al.

It is hereby certified that error appears in the above numbered patent requiring correction and that the said Letters Patent should read as corrected below.

Column 1, line 26, for "synthesisis" read -- synthesis --; column 2, line 5, for "addditional" read -- additional --; column 8, line 64, for "cooper" read -- copper --; column 12, line 4, for "of" read -- a --.

Signed and sealed this 10th day of October 1961.

(SEAL)
Attest:

ERNEST W. SWIDER                                      DAVID L. LADD
Attesting Officer                                         Commissioner of Patents
                                                                                    USCOMM-DC